United States Patent [19]
Gabas

[11] Patent Number: 5,842,382
[45] Date of Patent: Dec. 1, 1998

[54] CONTROL CABLE SELF-ADJUSTMENT DEVICE

[75] Inventor: Carlos Gabas, Barcelona, Spain

[73] Assignee: Fico Cables S.A., Rubi, Spain

[21] Appl. No.: 610,215

[22] Filed: Mar. 4, 1996

[51] Int. Cl.[6] ....................................................... F16C 1/22
[52] U.S. Cl. .................................... 74/501.5 R; 74/502.6; 403/229; 403/366; 411/348; 411/339; 411/509
[58] Field of Search ............................ 74/501.5 R, 500.5, 74/502.4, 502.6; 192/111 A; 403/229, 366, 377; 24/581; 411/348, 338, 339, 509

[56] References Cited

U.S. PATENT DOCUMENTS

| | | | |
|---|---|---|---|
| 2,732,861 | 1/1956 | Gilmore | 74/502.4 X |
| 3,437,059 | 4/1969 | Stonier et al. | 403/229 X |
| 3,665,784 | 5/1972 | Bennett | 74/502.6 |
| 4,244,238 | 1/1981 | Suzuki et al. | 74/502.6 |
| 4,334,438 | 6/1982 | Mochida | 74/502.4 |
| 5,101,213 | 3/1992 | Harada et al. | 403/229 X |

FOREIGN PATENT DOCUMENTS

| | | | |
|---|---|---|---|
| 3007461 | 9/1981 | Germany | 74/502.4 |
| P 9202141 | 10/1992 | Spain | |

Primary Examiner—Rodney H. Bonck
Assistant Examiner—Mary Ann Battista
Attorney, Agent, or Firm—Michael J. Striker

[57] ABSTRACT

The control cable self-adjusting device has an extended cylindrically shaped hollow base body (5) open at one of its ends (9) and a regulating stem (6) held inside the interior of the base body (5) by a retaining device. The closed end (10) of the base body (5) and the front end (15) of the regulating stem (6) are connected to respective intermediate ends (13,14) of the sheath (4) of a control cable (2). The retaining device (7) includes a saw-toothed threaded section (25) in the interior of the base body (5) and a retaining coil (26) connected to the stem (6) and engaged with the threaded section (25). The control cable length adjustment is made by pulling apart the intermediate ends (14,15) of the sheath (4) to deform the retaining coil (26) and move it from the inside to the outside of the base body (5) or by screwing the base body (5) on the stem (6) in either direction via the retaining coil (26).

6 Claims, 2 Drawing Sheets

CONTROL CABLE SELF-ADJUSTMENT DEVICE

BACKGROUND OF THE INVENTION

This invention relates to a self-adjusting device for control cables, which is applicable specifically to adjustment of the length of a control cable, consisting essentially of a sheathed steel cable. More particularly, the self-adjusting device of the invention is applicable to adjustment of the length of the control cable of the type usually used in the automobile industry.

Many embodiments of self-adjusting devices whose purpose is to adjust the length of the sheathed portion of control cables which link the mechanisms of a single device, such as the control cable linking the accelerator pedal with the corresponding mechanism of the engine carburetor of an automobile, or the control cable linking the brake shoes or calipers of the rear wheels with the hand brake lever, are known in the art. In general, such devices are factory-fitted on the control cable itself so that, once fitted on the vehicle, the action of the self-adjusting device takes up any length tolerance which occurs in various applications, leaving the control cable within the planned service conditions. It should be noted that such self-adjusting devices carry out the adjustment function only during fitting of the control cable onto the vehicle, leaving its length fixed permanently, unlike the cable length self-adjusting devices which work continuously to adjust that length to the operating requirements of the cable.

In general, the self-adjusting devices operate in such a way that adjustment of the control cable length is made by altering the length of a stem which, fitted on one of the ends of the control cable sheath, is attached to a main body linked to a fixed point of the vehicle structure.

Among the known embodiments of self-adjusting devices in which the control cable adjustment operation, once fitted onto the vehicle, is carried out by factory operation of the control mechanism to which the cable is linked, we might cite that of Spanish patent number 9202141. This device basically comprises a base body and a regulating stem of generally cylindrical shape arranged coaxially to each other, with the steel cable of the control cable running longitudinally through them, and the base body attached to a fixed point of the vehicle structure, while the stem is fixed to the corresponding end of the cable sheath; both parts of the device, base body and stem, have their respective and complementary retaining means, essentially consisting in a threaded section of trapezoidal cross section.

In the known embodiments of self-adjusting devices such as that described, the fact that adjustment of the control cable length is made by the action of a control mechanism which is attached to the cable has in some cases the disadvantage that access to the control mechanism is difficult, to say the least, so that adjustment of the control cable length has to be made in a subsequent phase. Among such cases could be cited those in which the self-adjusting device is fitted onto vehicles raised on ramps, as is the usual practice for fitting of the cable(s) of hand brakes.

SUMMARY OF THE INVENTION

It is an object of the present invention to provide a control cable self-adjusting device of the above-described type which does not suffer from the above-described disadvantages and which has a new structure and operation.

The self-adjusting device of the invention can be attached to an intermediate point of a control cable essentially made up of a sheathed steel cable in which the ends of the sheath are attached to respective fixed points. The device comprises a hollow base body of generally long cylindrical shape open at one of its ends, in the interior of which a regulating stem can move axially. The base body and regulating stem are provided with a respective longitudinal orifice through which the steel cable of the control cable passes with some free play, and respective and complementary retaining means which fix the position of the stem with respect to the base body. The base body is attached by its closed end to one of the intermediate ends of the cable sheath, while the regulating stem is linked by one of its ends, the front end opposite the open end of the base body, to the other intermediate end of the sheath.

The self-adjusting device of the invention is characterized in that the retaining means include inside the base body, a generally tooth-shaped threaded section of axial cross section, the orthogonal side of which faces the open end of the base body, and on the rear end of the adjusting stem, the one facing the closed end of the base body, a retaining coil of circular section and of a pitch coinciding with that of the threaded section of the base body whose ends are arranged at a relatively small distance from one another, the rear end of the stem and the retaining coil being coupled to each other through respective and complementary attachment means which permit the stem to move by traction in one direction, from inside to outside, by successive double elastic deformations of the retaining coil and that alternatively the stem can be moved independently in both directions, from inside to outside and from outside to inside, by screwing action of the retaining coil on the threaded section of the base body.

According to another characteristic of the self-adjusting device of the invention, the means of linkage comprise at one end of the retaining coil, a securing extension arranged axially to the interior, and at the other end a retaining extension with an initial axial portion, arranged to face the securing extension and linked to a second portion to make up a coaxial ring of lower diameter circular outline, and on the rear end of the adjusting stem, a section of substantially truncated-cone shape on which the retaining coil rests when not in mechanical operation, an axial orifice to house the retaining extension, an axial slot to house the initial axial portion of the retaining extension, and a coaxial slot to house the second circular portion of the retaining extension, all of this so arranged that the retaining coil, while fixed to the rear end of the stem, can deform elastically by reduction of its diameter.

According to another characteristic of the self-adjusting device of the invention, the entire regulating stem is permanently housed inside the base body.

According to another characteristic of the self-adjusting device of the invention, the corresponding intermediate end of the steel cable sheath is secured to the closed end of the base body by means of an adaptor body fixed to that intermediate end and attached to the base body in such a way that both bodies, base and adaptor, can rotate in relation to one another.

According to another characteristic of the self-adjusting device of the invention, the open end of the base body is provided with sealing means.

According to another characteristic of the self-adjusting device of the invention, the sealing means comprise a bellows of elastic material and generally cylindrical shape attached by one of its ends to the base body and by its other end to the portion of the cable sheath attached to the regulating stem.

The above-described characteristics of the self-adjusting device of the invention provide a solution to the problems presented by the known embodiments of self-adjusting devices on which the length-adjustment operation on the sheathed portion of the control cable is carried out by the action of the control mechanism to which they are linked. The self-adjusting device of the invention is supplied from its origin installed at an intermediate point of a control cable, both ends of whose sheath are fitted with their respective terminals for securing the sheathed portion of the control cable to a respective fixed point, the unit being supplied with the adjusting stem occupying a position near the closed end of the base body, that is, in an interior position. Once the control cable has been installed, the user simply has to carry out the following operations in order to adjust the length of the sheathed portion of the steel cable and thus take up any length tolerance presented by the arrangements of the control mechanism and the action mechanism. First, grasp the intermediate ends of the control cable near the self-adjusting device and then pull on both ends to separate them. These traction forces make the adjusting stem move from inside to outside in successive double elastic deformations of the retaining coil, this movement continuing up to the point of equalization of the forces applied by the user and tending to separate both ends and the force of reaction of the cable sheath when subjected to compression. The user then completes adjustment of the length of the sheathed portion of steel cable by pulling the base body and making it rotate about itself, which makes the regulating stem move by screwing of its retaining coil on the threaded section of the base body, subjecting the control cable sheath to greater compression. Under such conditions, once the length of the control cable has been adjusted, the position of the regulating stem with respect to the base body cannot under normal cable working conditions be altered, since the ends of the cable sheath are attached to said fixed points, making it impossible for the sheathed portions of the cable, and therefore the regulating stem, to rotate, while furthermore the saw-toothed threaded section prevents the stem from being pushed towards the closed end of the base body. If for any reason the control cable must be removed, the user simply has to withdraw it from its location without any need to move the self-adjusting device. And, when refitting the control cable, to reuse the self-adjusting device the user simply has to proceed to rotate the base body about itself while with one hand holding the end of the sheathed portion of control cable attached to the regulating stem, which leads the regulating stem retaining coil to screw onto the threaded section of the base body and the stem to move into the base body until it reaches the position in which it is supplied, leaving the self-adjusting device in its initial or supply position and ready for further use in the manner described above.

The characteristics of the self-adjusting device of the invention thus permit the length of the control cable to be adjusted without any need to move the control mechanism to which it is linked, thus providing a solution to the above-mentioned disadvantages presented by the known embodiments of self-adjusting devices which operate in this manner.

BRIEF DESCRIPTION OF THE DRAWINGS

The drawings of this specification show the control cable self-adjusting device of the invention. In the drawings.

DESCRIPTION OF THE PREFERRED EMBODIMENT

Figure 1:
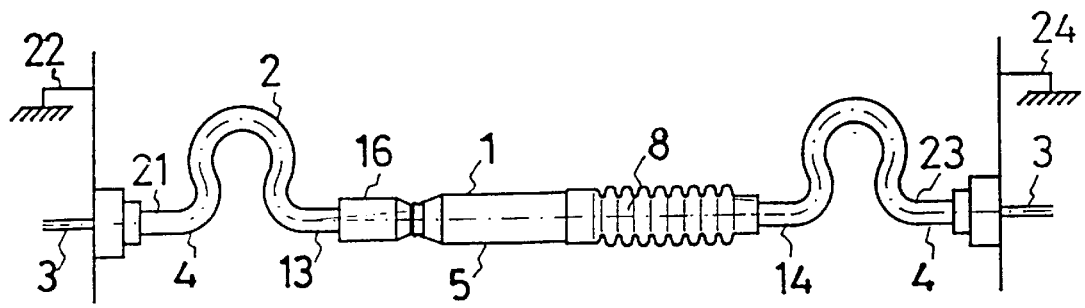
FIG. 1 is a side view of the self-adjusting device of the invention installed in a particular application.

The self-adjusting device 1 of the invention described as an exemplary embodiment is fitted as shown in FIG. 1 onto an intermediate point of a control cable 2, made up of a steel cable 3 provided with a sheath 4, linking two mechanisms such as control and operating mechanisms, which for the purposes of greater clarity are not shown. These mechanisms can be any mechanisms linked by a control cable of the type mentioned, such as the control cable linking automobile rear-wheel brake shoes or calipers to the hand brake lever.

Figure 2:
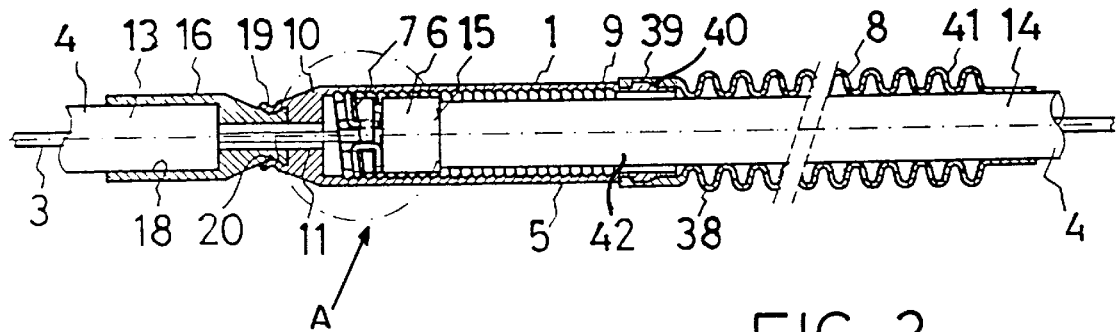
FIG. 2 is a longitudinal section view of the self-adjusting device as supplied from the factory.
Figure 3:
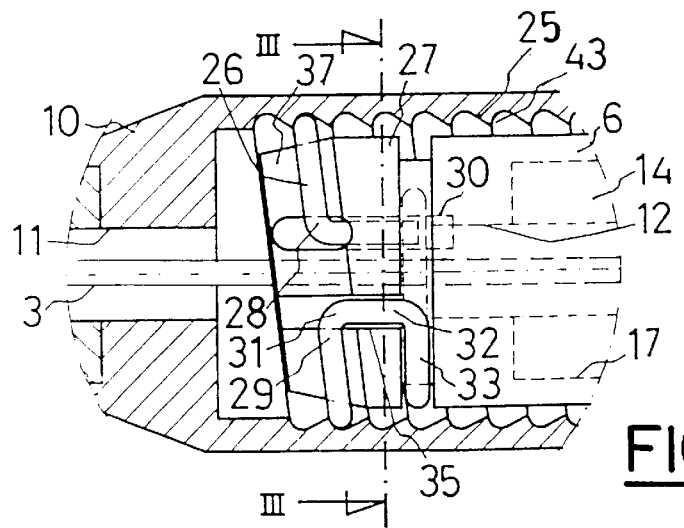
FIG. 3 is a detailed cutaway cross-sectional view of a portion A of the self-adjusting device shown in FIG. 2.

FIG. 2 shows how the self-adjusting device 1 comprises a base body 5, a regulating stem 6, retaining means 7, which are shown enlarged in FIG. 3, and a bellows 8.

The base body 5 is hollow and is of generally long cylindrical shape open at one end 9, while its other end 10 is closed and has an axial throughgoing passage 11, through which the steel cable 3 can slide with some free 20 play.

The regulating stem 6 has a generally cylindrical shape and is of dimensions in respect of diameter which permit it to slide snugly through the base body 5, and in respect of length significantly less than that of the base body 5. The stem 6 has a centered throughgoing passage 12 through which the steel cable 3 can slide with free play.

FIGS. 1, 2, 3, 5 and 6 show how one intermediate end 13 of the sheath 4 is firmly attached to the closed end 10 of the base body 5, while the other intermediate end 14 of the sheath 4 is firmly attached to the regulating stem 6 by its front end 15 facing the open end 9 of the body base 5. Connection of the intermediate end 13 with the closed end 10 is made by means of an adaptor body 16, while connection of the intermediate end 14 with the front end 15 is made by means of an orifice 17, shown in FIG. 3 and 6 by broken lines, into which the intermediate end 14 is inserted by pressure. The connection of the intermediate end 13 with the adaptor body 16 is made by means of an orifice 18 into which the intermediate end 13 is inserted by pressure, while the coupling of the adaptor body 16 with the closed end 10 is carried out by pressure by double elastic deformation of a clamping ring 19 at the closed end 10 and located in a coaxial slot 20 made for the purpose in the adaptor body 16. Once the adaptor body 16 has been attached to the closed end 10, the base body 5 and the adaptor body 16 can be rotated about each other in both directions.

FIG. 1 shows how the end 21 of the sheath 4 is firmly attached to a fixed point 22, while the other end 23 of the sheath 4 is in turn firmly attached to another fixed point 24. These attachments of the ends 21, 23 to the fixed points 22, 24 are shown schematically in FIG. 1 and can take any suitable configuration, without this affecting the essential nature of the invention, with the proviso that the attachment prevents the ends 21, 23 from rotating about themselves.

Figure 6:
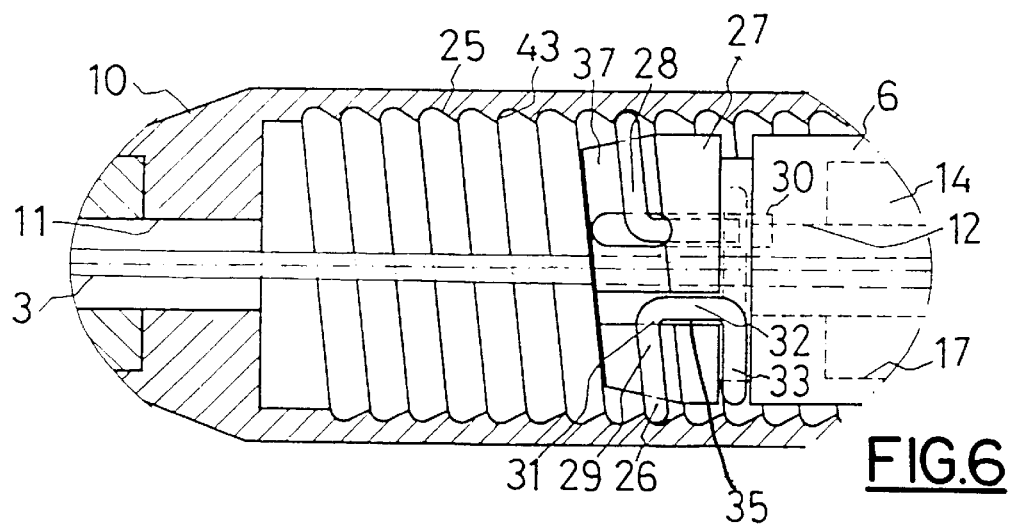
FIG. 6 is a detailed cutaway cross-sectional view of a portion B of the self-adjusting device shown in FIG. 5.

The enlarged detail of FIGS. 3 and 6 shows how the retaining means 7 comprise a threaded section 25, which extends throughout practically the entire interior length of the base body 5, and a retaining coil 26 of circular cross section which is attached at the back end 27 of the regulating stem 6. The threaded section 25 has a saw-toothed profile, the orthogonal side 43 of which is arranged facing the open end 9 of the base body 5, and the retaining coil 26 has a thread pitch which coincides with that of the threaded section 25.

The retaining coil 26 has its ends 28, 29 set at a relatively small distance from one another. The end 28 is extended in an axial attachment 30 to the interior, while the end 29 is extended in a retaining extension 31 including an axial portion 32 opposite the extension attachment 30 and an open circular portion 33 of smaller diameter connected to it shown by means of broken lines in FIG. 4.

Figure 4:
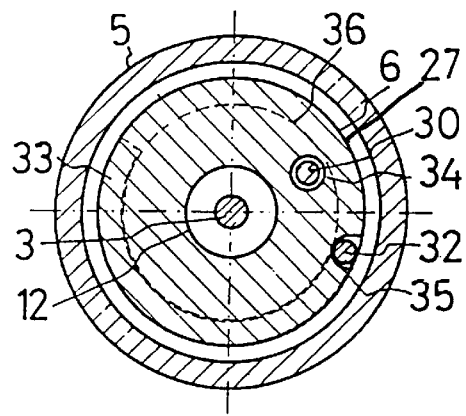
FIG. 4 is a transverse cross-sectional view through the self-adjusting device shown in FIG. 3 taken along the section line IV—IV.

As shown in the enlarged details of FIGS. 3 and 6 and in FIG. 4, for the coupling of the retaining coil 26 with the regulating stem 6, on the back end 27 of the stem 6 there is an axial orifice 34 which receives with free play the extension attachment 30, which can thus be slid in both directions, an axial slot 35 in which the axial portion 32 of the retaining extension 31 is housed, and a coaxial slot 36 in which the circular portion 33 of the retaining extension 31 is housed. All of this is arranged so that, when the retaining coil 26 is at rest, that is, when it is not in mechanical operation, it rests on the truncated cone surface 37 forming the back end 27 of the stem 6 and enmeshed with the threaded section 25 of the base body 5.

Figure 5:
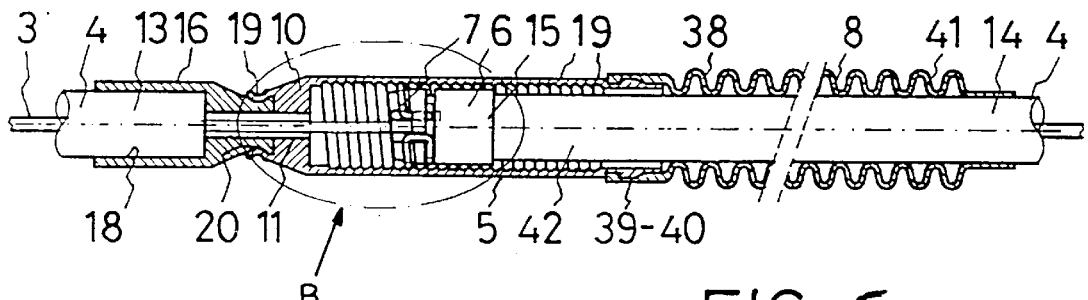
FIG. 5 is another longitudinal section view of the self-adjusting device shown in FIG. 2 after adjusting the length of the control cable.

The bellows 8 prevents the entry of dirt into the base body 5 and, as shown in FIGS. 2 and 5, is of generally cylindrical shape linked at the end 38 to the open end 9 of the base body 5 by means of a perimetral projection 39 which is engaged in a corresponding annular slot 40 provided for the purpose in the base body 5, while at its other end 41 it is attached by pressure to the sheath 4. The bellows 8 being of suitable size to take up the variations of length undergone by the portion 42 of sheath 4 inserted into the base body 5.

The operation of the self-adjusting device 1 of the invention, of which one embodiment is described by way of example, is explained below:

the self-adjusting device 1 is supplied from factory with its regulating stem 6 in its most fully interior position near the closed end 10 of the base body 5, as shown in FIG. 2;

once the self-adjusting device 1 has been fitted as shown in FIG. 1, that is, with the ends of the steel cable 3 attached to the corresponding mechanisms, and with the ends 21, 23 of the sheath 4 secured to respective fixed points 22, 24, adjustment of the control cable length calls for the user to carry out the following operations;

first, grasp the intermediate ends 13, 14 of the sheath 4, and then pull on them to separate them and thus subject the sheath 4 to compression, thus making the regulating stem 6 move from the inside to the outside of the base body 5, that is, so that the length of the portion 42 of the sheath 4 contained in the base body 5 becomes smaller, continuing this movement until the forces applied by the user and the elastic reaction of the sheath 4 are equalized;

during the movement of the regulating stem 6, the retaining coil 26 is subjected to successive double elastic deformations following the profile of the threaded section 25, the elastic deformations consisting of successive reductions and recoveries of the diameter of the coil 26 on the truncated-cone surface 37 of the back end 27 of the stem 6, with the circular portion 33 of the retaining extension 31 of the retaining coil 26 preventing the latter from coming away from the stem 6;

once the regulating stem 6 reaches a more forward position and the user stops acting upon the intermediate ends 13, 14 of the sheath 4, the elastic reaction of the latter tends to draw the regulating stem 6 into the base body 5, with withdrawal of the stem 6 canceling the effect of the retaining coil 26 on the orthogonal side 43 of the threaded section 25;

secondly, adjustment of the control cable length is completed by holding the base body 5 and making it rotate about itself so that it can be coupled to the adaptor body 16, carrying out this rotation of the base body 5 by turning it on the regulating stem 6 acting as a screw by means of the retaining coil 26, which maintains its configuration, that is, so that it is not deformed during the screwing action by the extension movement of the attachment 30 and the axial portion 32 of the retaining extension 31, and continuing this rotation of the base body 5 until the control cable 2 is left set in the service conditions as shown in FIG. 4.

When for any reason the control cable 2 has to be removed from its location, the user need only withdraw the cable 2 by disconnecting the ends of the steel cable 3 from the mechanisms while at the same time detaching the ends 21, 23 from the respective fixed points 22 and 24, all of this clearly without any need to act upon the self-adjusting device 1. When replacing the control cable 2, the user must first place the regulating stem 6 in the position in which the control cable 2 is originally supplied, that is, near the closed end 10 of the base body 5, achieving that position by simply rotating the base body 5 about itself while at the same time keeping the intermediate end 14 of the sheath 4 held attached to the regulating stem 6, so that by screwing of the base body 5 on the stem 6 by means of the retaining coil 26, the self-adjusting device is left in its initial position, thus permitting, as explained above, adjustment of the control cable 2 length.

I claim:

1. A control cable self-adjusting device fitted to an intermediate point on a control cable, said control cable (2) comprising a steel cable (3) and a sheath (4) for the steel cable (3), said sheath (4) having sheath ends (21,23) attached to respective fixed points (22,24) and intermediate ends (13,14) between the sheath ends (21,23) so that said sheath (4) is in two separate portions, wherein said self-adjusting device comprises:

a hollow base body (5) of a longitudinally extended cylindrical shape, having a closed end (10) and an open end (9) remote from said closed end (10) and provided with a throughgoing passage (11) through which said steel cable (3) passes with free play, said closed end (10) of said base body (5) being attached to one (13) of said intermediate ends of said sheath (4);

a regulating stem (6) held axially movable in an interior of said hollow base body (5), said regulating stem (6) having a rear end (27) facing said closed end (10) of said base body (5) and a front end (15) facing said open end (9) of said base body (5), said front end (15) of said regulating stem (6) being connected to another (14) of said intermediate ends of said sheath and said regulating stem (6) being provided with a throughgoing passage (12) through which said steel cable (4) passes; and retaining means (7) for fixing said stem (6) in a position relative to said base body (5), said retaining means (7) including a retaining coil (26) arranged on said rear end (27) of said stem (6) and having a circular cross-section with respective ends (28,29) spaced a distance from each other, a substantially saw-tooth shaped threaded section (25) provided in said interior of said base body (5) and having an orthogonal side (43) facing said open end (9) of said base body (5), said retaining coil being engaged in said threaded section (25) and said threaded section (25) having a pitch substantially the same as that of said retaining coil (26), and linking means for connecting said rear end (27) of said stem (6) and said retaining coil (26) with each other so that said stem (6) is movable in one direction in said base body (5) from inside to outside by successive double elastic deformations of said retaining coil or in either said one direction from inside to outside or in another direction from outside to inside by screwing action of said retaining coil (26) in said threaded section (25) of said base body (5).

2. The control cable self-adjusting device as defined in claim 1, wherein said retaining coil (26) has one retaining extension (30) at one (28) of said respective ends (28,29) arranged axially in the interior of the base body (5) and another retaining extension (31) arranged at another (29) of said respective ends, said another retaining extension (31) comprising an axial portion (32) facing said one retaining extension (30) and a circular portion (33) connected to said axial portion (32), said circular portion (33) comprising a coaxial ring shaped part of a diameter smaller than an outer diameter of said retaining coil; and said rear end (27) of said regulating stem (6) is provided with an axial slot (35) to receive said axial portion (32) of said another retaining extension (31) and a coaxial slot (36) to hold said circular portion (33) of said another retaining extension (31) and said rear end (27) includes a substantially truncated-cone shaped section (37) on which said retaining coil (6) rests when not in mechanical operation, and said retaining coil (26), while fixed on said rear end (27) of said regulating stem (6), is elastically deformable by compression to reduce said outer diameter.

3. The control cable self-adjusting device as defined in claim 1, wherein said regulating stem (6) is permanently retained inside said interior of said base body (5).

4. The control cable self-adjusting device as defined in claim 1, further comprising an adaptor body (16) connecting said one (13) of said intermediate ends of said sheath (4) to said closed end (10) of said base body so that said base body (5) and said adaptor body (6) can rotate in relation to each other.

5. The control cable self-adjusting device as defined in claim 1, further comprising sealing means for said open end (9) of said base body, wherein said sealing means prevents entry of dust and dirt into said interior of said base body (5).

6. The control cable self-adjusting device as defined in claim 5, wherein said sealing means comprise a bellows (8) of elastic material and of a substantially cylindrical shape attached by one end (38) thereof to said base body (5) and by another end (41) thereof to a section of said sheath (4) attached to said regulating stem (6).

* * * * *